United States Patent [19]

Ichizawa et al.

[11] 4,352,424
[45] Oct. 5, 1982

[54] DEVICE FOR CONVEYING MOLDED PIECES

[75] Inventors: Yoshiyuki Ichizawa, Sohka; Tsugio Nomoto, Higashi Kurume, both of Japan

[73] Assignee: Yoshino Kogyosho Co., Ltd., Tokyo, Japan

[21] Appl. No.: 206,659

[22] Filed: Nov. 13, 1980

Related U.S. Application Data

[63] Continuation of Ser. No. 56,990, Jul. 12, 1979, abandoned.

[30] Foreign Application Priority Data

Jul. 13, 1978 [JP] Japan .................................. 53/85541

[51] Int. Cl.³ ............................................ B65G 47/34
[52] U.S. Cl. .................................. 198/482; 198/563; 198/735
[58] Field of Search ............... 198/389, 476, 482, 560, 198/563, 607, 728, 735, 801

[56] References Cited

U.S. PATENT DOCUMENTS

| | | | |
|---|---|---|---|
| 1,733,667 | 10/1929 | Lahr et al. | 198/801 |
| 2,326,165 | 8/1943 | Pelosi | 198/801 |
| 3,595,374 | 7/1971 | Whitfield | 198/563 |
| 3,704,780 | 12/1972 | Aidlin et al. | 198/476 |
| 4,223,778 | 9/1980 | Kontz | 198/389 |

Primary Examiner—Joseph E. Valenza
Attorney, Agent, or Firm—Stevens, Davis, Miller & Mosher

[57] ABSTRACT

A device for obliquely conveying pieces of cylindrical hollow shape with a bottom for forming a thin, transparent, bottle-shaped container from the floor level to the height for supplying the pieces to the mold of a blow-molding machine. The numerous pieces are simultaneously injection-molded from a polyethylene terephthalate resin via an injection molding machine, and are supplied to the mold of the blow-molding machine after being cooled to room temperature. Each of the pieces thus formed is conveyed via a rope conveyor in a vertically neck portion upward position as lifted from the conveyor, and is further conveyed obliquely upwardly by an oblique conveyor having a plurality of attachments attached to the conveyor's chain for supporting the pieces at the bottoms to exactly convey the pieces one by one to meet the molding speed of the blow-molding machine.

2 Claims, 9 Drawing Figures

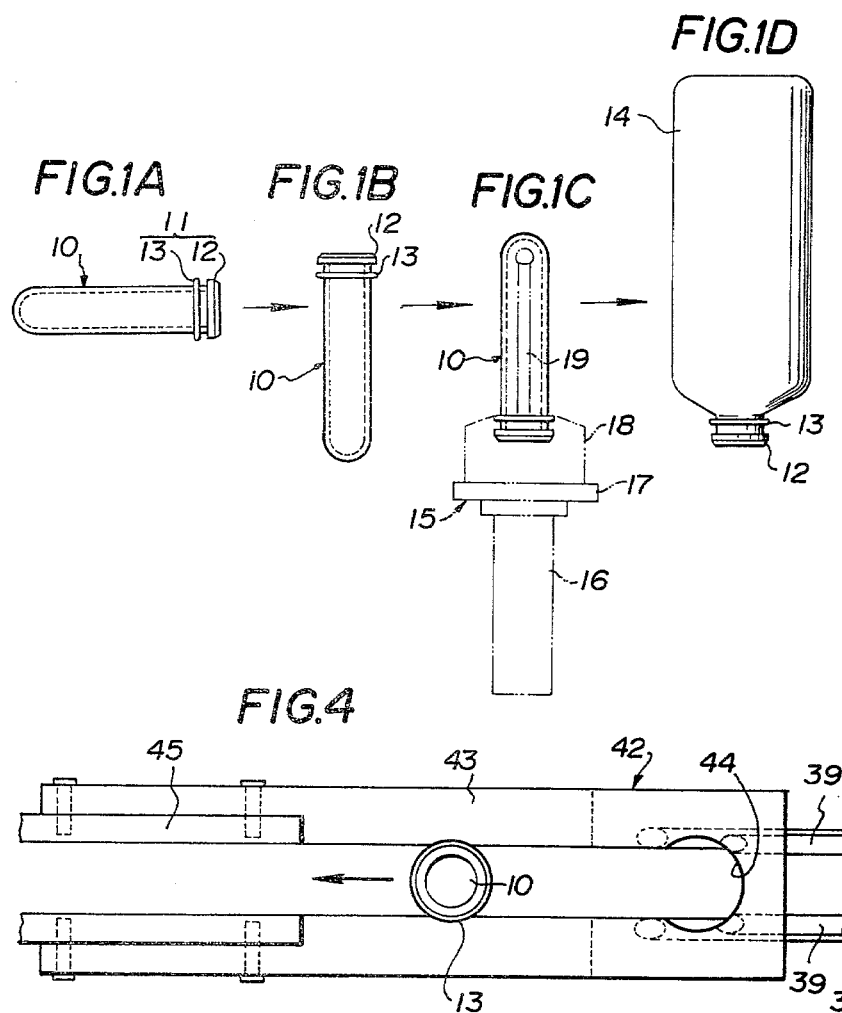

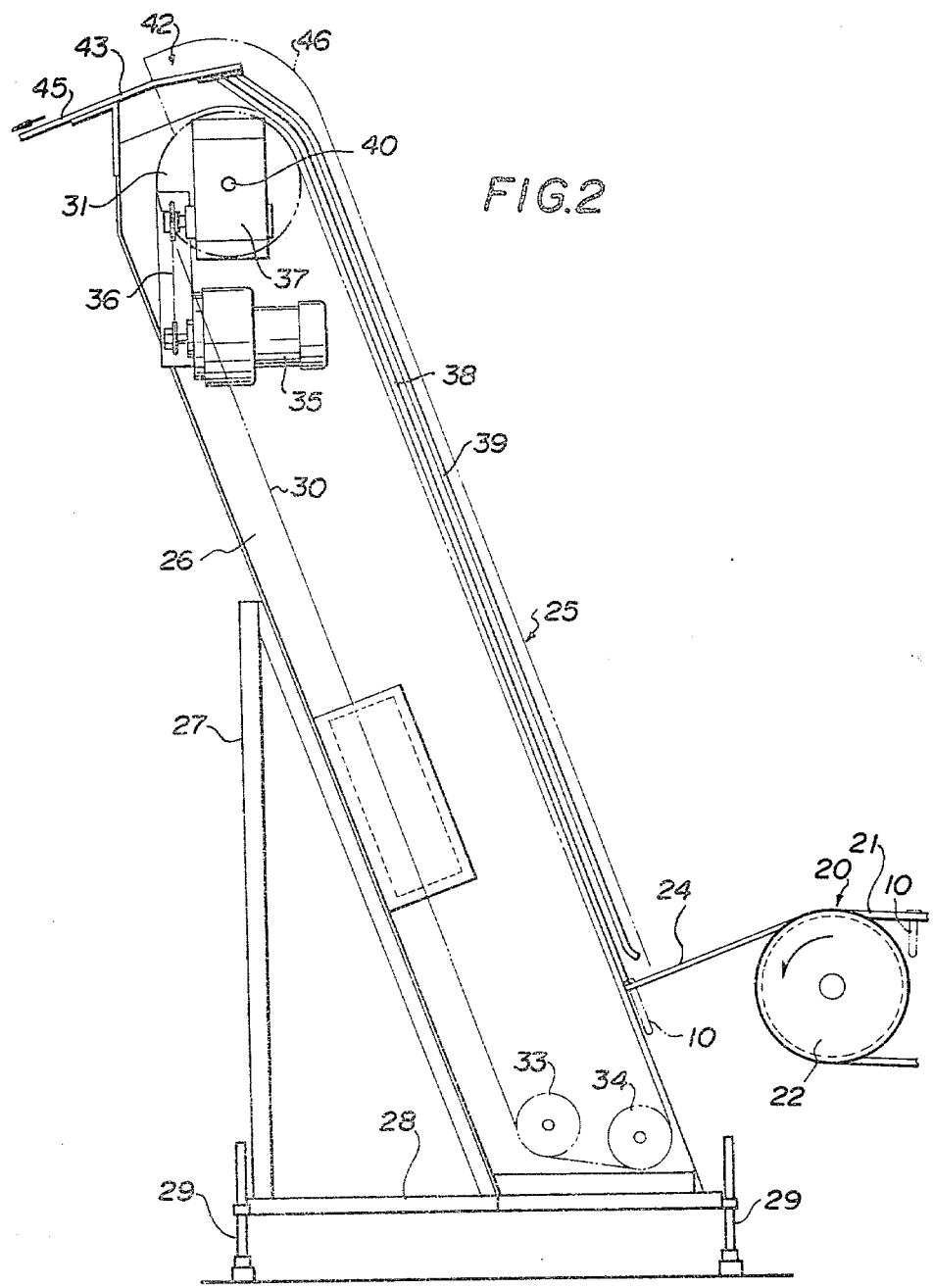

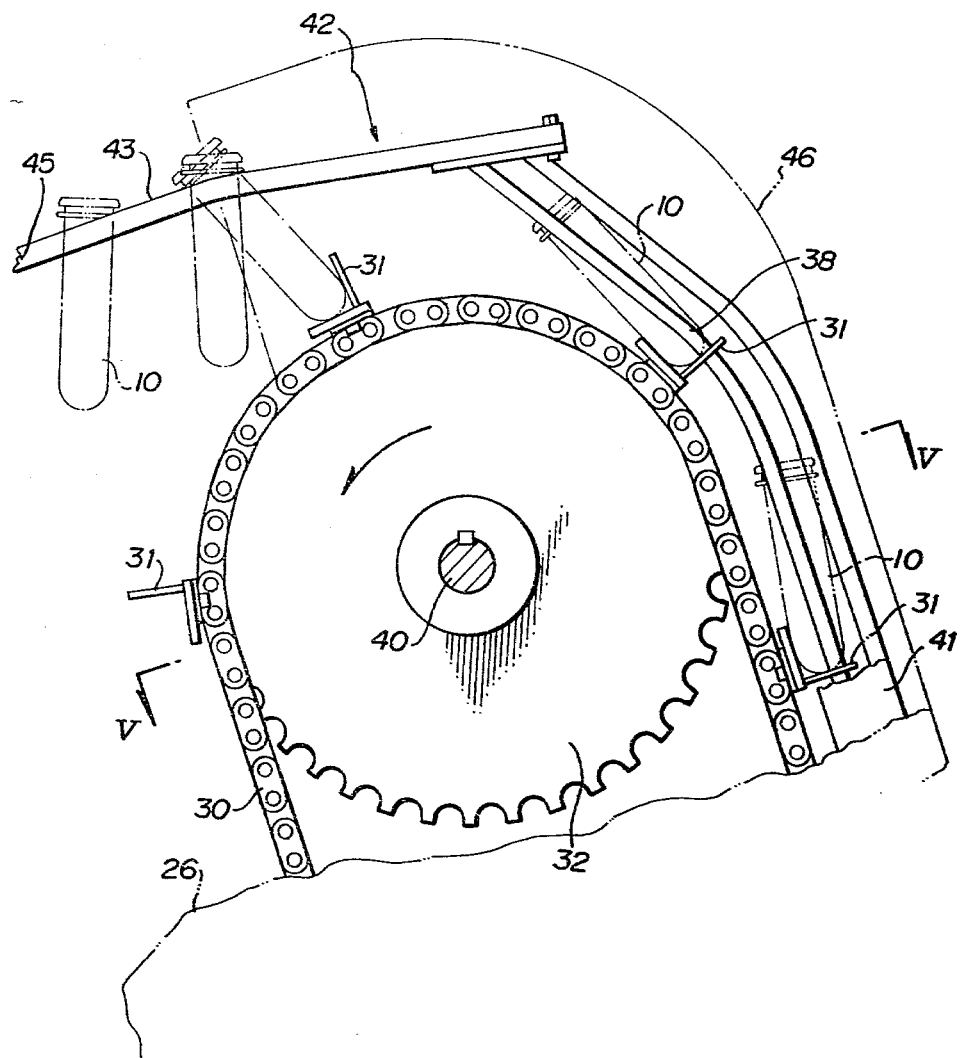

DEVICE FOR CONVEYING MOLDED PIECES

This is a continuation of application Ser. No. 56,990 filed July 12, 1979, now abandoned.

BACKGROUND OF THE INVENTION

This invention relates to a device for conveying a piece for forming a bottle-shaped container and, more particularly, to a steeply inclined conveyor for lifting a plurality of injection-molded pieces and, immediately after cooling or cooling and stocking, conveying them upwardly one by one to the piece supplying position of a blow-molding machine.

A bottle-shaped blow-molded thin transparent container of biaxially oriented plastic is fabricated by heating a closed bottom cylindrical piece of polyethylene terephthalate resin and biaxially orienting it longitudinally and laterally in the mold of a blow molding machine. Since numerous pieces are simultaneously molded from an injection molding machine and are respectively fed in the state directed at random, it is not easy to supply the pieces one by one to a biaxial orientation blow molding machine to meet the molding speed of the blow molding machine. As the capacity of the piece molding machine is, in addition, not normally equal to that of the blow molding machine, numerous pieces thus injection-molded are temporarily stocked and are then aligned and supplied sequentially as required.

It is, therefore, necessary that a device for conveying the pieces thus injection-molded to the blow molding machine affords to loop the numerous pieces before supplying to the blow molding machine for molding the pieces sequentially at a predetermined time interval into bottle-shaped containers. It is also required to afford a time needed to cool the pieces which are not immediately after injection-molding. Accordingly, the piece conveying device must employ a relatively long conveying distance.

In the meantime, it is the most simple and exact method to hold the piece while lifting it via the flange formed at the neck portion of the piece in an upwardly opening position and to lower it by means of the self-weight of the piece as maintained vertically in the upwardly opening position on an oblique surface to thereby supply it to the mold of a blow molding machine. However, both the injection molding and blow molding machines are normally installed directly on the floor in a factory. It is consequently impossible in fact to dispose the mold of the blow molding machine higher than that of the injection molding machine and accordingly lower than the piece pickup position. Furthermore, as the piece conveying device necessitates relatively long conveying distance of the piece, it is also difficult to provide the piece conveying path only with the oblique surface.

It has to, therefore, devise certain means for conveying the pieces as retained vertically in the upwardly opening attitude by suitable means, via appropriate feeding means. However, it will not only introduce an expensive facility cost, but also result in complicated maintenance and management with excessive man hours being necessary to install such a complicated means over the entire piece conveying route of relatively long distance.

SUMMARY OF THE INVENTION

Accordingly, it is an object of the present invention to provide a device for conveying molded pieces which can smoothly convey the pieces to be formed into bottle-shaped containers by lifting them via the respective flanges formed at the neck portions of the respective pieces in a vertically upwardly opening position.

Another object of the present invention is to provide a device for conveying molded pieces which can accurately convey the pieces fed in the state of lifting them via the flanges of the pieces one by one from the lower position at the mold of an injection molding machine to the higher position at the mold of a blow molding machine via a steeply inclined conveyor with a plurality of attachments.

Yet another object of the present invention is to provide a device for conveying molded pieces which can sequentially convey the pieces via the attachments attached to the steeply inclined conveyor smoothly into an exhaust chute without accumulation of the pieces.

Still another object of the present invention is to provide a device for conveying molded pieces which can convey the pieces through long conveying distance by means of the self-weight of the pieces via the steeply inclined surface.

Still another object of the invention is to provide a device for conveying molded pieces which can inexpensively convey the pieces smoothly along the steeply inclined surface by means of the self-weight of the pieces.

Still another object of the invention is to provide a device for conveying molded pieces which can reduce the required floor space for installing the device in a factory by greatly decreasing the horizontal piece conveying path in length.

Still another object of the invention is to provide a device for conveying molded pieces which can smoothly transfer the pieces from a piece supply chute to the steeply inclined conveyor and from the latter to a piece exhaust chute without irregularity in the piece feeding speed over the entire device by conveying the pieces always in the state of lifting them via the flanges formed at the neck portions of the respective pieces vertically in the upward opening position.

BRIEF DESCRIPTION OF THE DRAWINGS

These and other objects, features and advantages of the invention will become more apparent upon a reading of the following detailed specification and drawings, in which:

FIG. 1A is a side horizontal view of a piece for forming a bottle-shaped container to be conveyed via the device constructed according to the present invention;

FIG. 1B is a side elevational view of the piece shown in FIG. 1A but illustrating the position during conveying as lifted vertically according to the present invention;

FIG. 1C is a side view of the piece attached to a jig in its inverted state;

FIG. 1D is a side view of a bottle-shaped container blow-molded from the piece conveyed according to the present invention;

FIG. 2 is a side elevational view of the device for conveying the pieces constructed according to the present invention;

FIG. 3 is an enlarged partial side elevational view fragmentarily cut in the vicinity of the upper sprocket in the device for conveying the pieces shown in FIG. 2;

FIG. 4 is a plan view of the portion shown in FIG. 3 in the device for conveying the pieces of the present invention;

DESCRIPTION OF THE PREFERRED EMBODIMENTS

Figure 5:
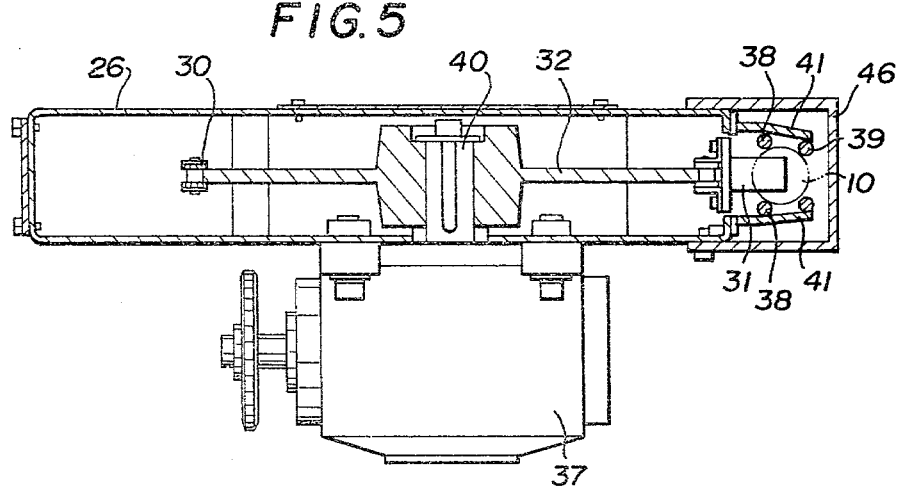
FIG. 5 is a partially sectional view of the portion shown and cut in the line V—V in FIG. 3 as seen in the direction from arrows.

Referring now to the drawings, FIG. 1A shows a piece to be formed into a bottle-shaped container to be conveyed according to the present invention, wherein like reference numerals designate the same parts in the following views and among the views followed with each other. The piece 10 has a relatively thick, cylindrical, hollow shape with a bottom and a prefinished neck portion 11 formed beforehand simultaneously with a neck end 12 and a flange 13 at its opening side. Numerous pieces 10 simultaneously molded in an injection molding machine (not shown) are conveyed in lateral position as shown in FIG. 1A, on a belt conveyor (not shown) and thus cooled to room temperature. After the pieces 10 are cooled to room temperature, they are normally lifted via a rope conveyor to be then conveyed as will be described in greater detail. The pieces 10 are conveyed via the rope conveyor in such a manner that the neck portion 11 is engaged with the ropes (not shown) extended at both sides of the flange 13 formed in neck portion 11 upward position as shown in FIG. 1B. The pieces are then transferred from the rope conveyor into a steeply inclined conveyor, which will be described in greater detail, are upwardly conveyed via the conveyor, and are then conveyed and installed to a jig 15 by a piece holding and inverting mechanism (not shown) as shown in FIG. 1C. The jig 15 consists of a cylindrical mandrel 16, a disk portion 17 to be engaged with the attachment (not shown) of a jig feeding mechanism (not shown), a piece neck support 18, and an orientation core shaft 19. When each of the pieces 10 is biaxially oriented longitudinally and laterally in a biaxially orientation blow-molding machine (not shown), it is expanded at the body and bottom thereof as blow-molded into a thin transparent bottle-shaped container 14 as shown in FIG. 1D. The aforementioned jig and biaxially orientation blow-molding machine are exemplified and disclosed in U.S. patent application Ser. No. 973,439 filed on Dec. 26, 1978, now U.S. Pat. No. 4,233,010 issued Nov. 11, 1980.

FIG. 2 shows the device for conveying the molded pieces according to the present invention as one preferred embodiment. The device of the present invention consists of a rope conveyor 20, a piece supply chute 24, a steeply inclined or oblique conveyor 25, and a piece exhaust chute 45. The rope conveyor 20 has a pair of ropes 21, 21, and a pair or pulleys 22, one of which is illustrated, for driving the ropes 21 in the direction as designated by an arrow in FIG. 2 to thereby convey the pieces 10 by holding them between the ropes 21 via the flanges 13 formed at the neck portions 11 of the pieces 10. The piece supply shute 24 has two bars spaced at a predetermined distance and slightly inclined from the end of the rope conveyor 20 toward the conveyor 25. The pieces 10 are sequentially inserted between the two bars of the supply chute 24 by engaging them via the flanges 12 at the neck portions 11 thereof vertically in upward neck portion position, and are thus slidably fed toward the conveyor 25. Thus, the pieces 10 are transferred from the supply chute 24 into the conveyor 25, are conveyed upwardly via the conveyor 25, and are then transferred from the upper end of the conveyor 25 into the piece exhaust chute 45 toward the next step.

In the preferred embodiment shown in FIG. 2, the oblique conveyor 25 is fixedly installed on a floor surface in a steeply inclined position with a frame plate 26 mounted on the floor surface via posts 27 and base plates 28 through legs 29. A looped chain 30 is engaged over the frame plate 26 between an upper drive sprocket 32 and lower driven sprockets 33, 34 with a plurality of attachments 31 (FIG. 3) attached at predetermined interval to the chain 30 for supporting the bottoms of the respective pieces 10 supplied from the supply chute 24. The drive sprocket 32 is driven by a motor 35 at the shaft 40 thereof via a transmission member 36 connected from the motor 35 and a reduction gear 37 coupled from the transmission member 36 to the shaft 40 of the drive sprocket 32. As particularly exemplified also in FIG. 5, two pairs of guide rails 38, 39 (four) are provided at the forth side of the chain 30 for surrounding the flanges 13 of the respective pieces 10.

These four guide rails 38, 39 are secured, in one example, to guide rail mounting side plates 41, 41 secured to the frame plate 26 as shown in FIGS. 2 and 5.

These four guide rails 38, 39 are secured so that they are spaced with each other at a predetermined distance so that the neck portion 11 and the flange 13 of the piece 10 may not be pulled out from the respective spaces thereof, namely, at a distance smaller than the outer diameter of the flange 13 of the piece 10. The two rails 38, 38 are spaced so that the body of the piece 10 may be pulled out from the space between them.

Since the guide rails 38, 39 are steeply inclined, the piece 10 held by the flange 13 among the four guide rails 38, 39 is, as exemplified and disclosed in FIG. 3, so disposed that the body and bottom thereof is suspended down through the interval between the lower guide rails 38, 38 on the outer surface of the chain 30 while the flange 13 thereof is merely retained within the four guide rails 38, 39.

Figure 6:
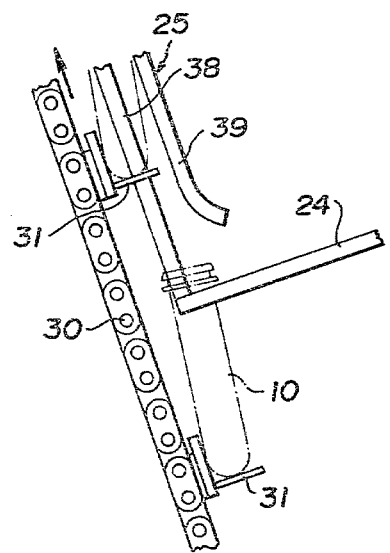
FIG. 6 is a partially enlarged side elevational view of the piece transfer portion from the piece supply chute into the steeply inclined conveyor in the device for conveying the pieces of the present invention.

As preferably exemplified also in FIG. 6, these four guide rails 38, 39 forming a piece guiding path are connected at the lower end thereof to the supply chute 24 in such a manner that the lower guide rails 38, 38 are extended to make contact with the supply chute 24. In other words, the lower guide rails 38, 38 are so provided that the piece 10, when slid down on the supply chute 24, may make contact at the flange 13 with the lower guide rails 38, while the upper guide rails 39, 39 are so provided that the piece 10, when slid down on the supply chute 24, may not make contact with the flange 13. The upper guide rails 39 are cut at a higher position at their lower ends than the lower guide rails 39 and are bent substantially outwardly so that the piece 10 pushed up by the attachment 31 is easily inserted among the four guide rails 38, 39 at the flange 13.

In the preferred embodiment shown in FIGS. 3 and 4, the conveyor 25 also has a piece delivery portion 42 for conveying out or transferring the piece 10 conveyed to the top thereof into the piece exhaust chute 45. This piece delivery portion 42 has a piece transfer chute plate 43 secured at the tops of the four guide rails 38, 39 the respective tops being slightly bent along the peripheral surface of the drive sprocket 32 toward the piece delivery portion 42 at the uppermost piece conveying position. The chute plate 43 extends to the exhaust chute 45 directly above the drive sprocket 32. The transfer chute plate 43 has a piece passing hole 44 perforated in its face having a diameter of a size enabling the flange 13 to pass therethrough as the piece 10 is pushed up along the guide rails 38, 39.

The conveyor 25 further has a cover 46, as designated by two-dotted broken line in FIGS. 2 and 3, over and along the conveying path of the conveyor 25. The cover can be transparent to allow an operator to monitor the piece conveying state as required.

Further, as shown in FIG. 6, when the piece 10, fed via the supply chute 24, makes contact at the neck portion 11 thereof with the lower ends of the lower guide rails 38, 38 of the conveyor 25, it tends to assume a vertical position by means of its self-weight, thereby making contact at its bottom with the outside surface of the chain 30. Thus it is pushed upwardly by the attachment 31 attached to the chain 30 along the guide rails 38, 39 while being retained in a slightly inclined position so as to thereby smoothen the inserting operation of the piece 10 among the four guide rails 38, 39 and the sliding movement of the piece 10 along the guide rails.

The guide rails 38, 39 of the conveyor 25 of the preferred embodiment shown in FIG. 3 are bent along the peripheral surface of the drive sprocket 32 at their tops, and are preferably bent at a steeply inclined angle along the peripheral surface of the drive sprocket 32 to thereby increase the inclination of the piece 10 when it is conveyed from the guide rails 38, 39 into the transfer chute plate 43. Thus the steep inclination of the four guide rails 38, 39 can impart sufficient lowering speed of the piece by means of the pushing force of the attachment 31 attached to the chain 30, to the piece 10 transferred from the transfer chute plate 43 into the exhaust chute 45 slidably.

In operation of the device for conveying the molded pieces 10 constructed thus according to the present invention, the piece 10 fed via the supply chute 24 makes contact at the neck portion 11 or at the flange 13 thereof with the lower ends of the lower guide rails 38, 38 of the conveyor 25, and is then stopped to be conveyed through the four guide rails 38, 39 of the conveyor 25 with the bottom thereof retained in contact with the chain 30 in a slightly inclined position at the lower ends of the lower guide rails 38, 38.

When each of the attachments 31, secured at predetermined intervals to the chain 30, is moved upwardly along the chain 30 and the four guides 38, 39 toward the piece 10 thus stopped, it will push up the piece 10 at the bottom from the stopped state in a slightly inclined position. Thus flange 13 retains contact with the lower guide rails 38, 38 and will be inserted among the guide rails 38, 39. Thus, the piece 10 is conveyed upwardly while maintaining the piece position as it is pushed upwardly along the guide rails 38, 39.

The piece 10 thus pushed up by the attachment 31 is then projected merely at the neck portion 11 and at the flange 12 from the piece passing hole 44 perforated in the piece transfer chute plate 43, and is slid further by the attachment 31 on the transfer chute plate 43 to be thus transferred into the exhaust chute 45.

It is noted when each attachment 31 has a lower height than the height of the piece 10, at the interval from the transfer chute plate 43 at the position around the peripheral surface of the drive sprocket 32, it can push the piece 10 when the attachment 31 is disposed at the top of the chain 30 in such a manner that the piece 10 is inclined at the flange 13 thereof toward the conveying direction or the exhaust chute 45. This smoothly slidably transfers the piece 10 from the transfer chute plate 43 toward the exhaust chute 45 upon pushing of the bottom of the piece 10 by the attachment 31, thereby sequentially transferring the pieces 10 thus pushed up successively by the attachments 31 toward the exhaust chute 45 without accumulation of the pieces 10 at the transfer chute plate 43.

It should be understood from the foregoing description that, since the device for conveying the molded pieces of the present invention can continuously convey upwardly the pieces from the end of the piece supply chute to the start of the piece exhaust chute by lifting them via the flanges vertically in the upward neck portion position, it can convey the pieces through a long conveying distance by means of the self-weight of the pieces via the steeply inclined surface of the conveyor.

It should also be appreciated that since the device of the present invention utilizes the most inexpensive and exact means for smoothly conveying the pieces by means of the self-weight of the pieces along the oblique surface, it can stably and inexpensively convey the pieces smoothly along the conveyor.

It should also be understood that since the device of the present invention is installed in vertical state to convey the pieces along a short horizontal conveying path, it can reduce the floor space required for installing the device and will also not disturb the other various machines installed on the floor.

It should also be appreciated that since the device of the present invention lifts and conveys the pieces fed from the supply chute of the prior stage in the same position as before, and conveys them to the exhaust chute of the next stage in the same position as the previous position, it can smoothly transfer the piece from the supply chute to the steeply inclined conveyor and from the latter to the exhaust chute without an irregularity in the piece feeding speed over the entire device.

What is claimed is:

1. A device for conveying molded pieces used for forming bottle-shaped containers, each of said pieces having a body, a flange formed on one end of said body and a body bottom formed on the end opposite said flange, said device comprising:
   piece supply means for slidably feeding said pieces to a near vertically inclined endless conveyor, said conveyor comprising;
   a chain-engaged drive sprocket;
   drive means for driving said sprocket at a constant speed in a predetermined direction;
   a guide sprocket, either said guide sprocket or said drive sprocket being a top sprocket located at the top of said endless conveyor;
   an endless drive chain connecting said drive sprocket and said guide sprocket;
   supporting-pushing attachments attached at equal, predetermined intervals along said drive chain, said attachments being capable of supporting the body bottoms of the pieces;
   upper and lower pairs of guide rails, said lower pair of guide rails being closer to said drive chain than said upper pair, said guide rails being parallel to and outside said chain, located so that the portion of said drive chain nearest said guide rails moves upwardly, said guide rails surrounding the flange of said piece when said piece is pushed upwardly by said attachments, said lower pair of guide rails being in contact with or immediately adjacent to said piece supply means so that the flange of a piece located at the end of said piece supply means nearest said endless conveyor contacts the lower pair of guide rails;

piece exhaust means for slidably feeding said pieces from said endless conveyor at the top of said conveyor by engaging said flanges, said attachments extending outwardly from said chain a distance less than the vertical distance encompassed by said pieces when positioned along the top sprocket and supported by said piece exhaust means;

a piece delivery portion for conveying out the piece conveyed to the top of said endless conveyor into said exhaust means, said piece delivery portion having a piece transfer chute plate secured to the tops of said guide rails, said guide rails being slightly bent along the peripheral surface of the top sprocket toward the piece delivery portion to provide an uppermost piece conveying position, said chute plate extending to said exhaust means directly above the top sprocket, said chute plate having a piece passing hole formed therein of a size to allow the flange of the pieces to pass therethrough.

2. The device according to claim 1, wherein said piece supply means comprises two bars slightly inclined toward said endless conveyor, said bars being spaced to slidably engage the pieces in a vertically flange upward position by holding the flanges of the pieces, each one of said bars contacting one of said lower pair of guide rails.

* * * * *